US009659272B2

(12) United States Patent
Birch et al.

(10) Patent No.: US 9,659,272 B2
(45) Date of Patent: May 23, 2017

(54) METHOD AND APPARATUS FOR MANAGING PRODUCT PLACEMENT ON STORE SHELF

(75) Inventors: Thomas A. Birch, Portland, OR (US); Michael J. Kasper, Portland, OR (US)

(73) Assignee: Intel Corporation, Santa Clara, CA (US)

(*) Notice: Subject to any disclaimer, the term of this patent is extended or adjusted under 35 U.S.C. 154(b) by 237 days.

(21) Appl. No.: 13/976,327

(22) PCT Filed: Apr. 5, 2012

(86) PCT No.: PCT/US2012/032420
§ 371 (c)(1),
(2), (4) Date: Sep. 17, 2013

(87) PCT Pub. No.: WO2013/151553
PCT Pub. Date: Oct. 10, 2013

(65) Prior Publication Data
US 2014/0006229 A1    Jan. 2, 2014

(51) Int. Cl.
*G06Q 10/00* (2012.01)
*G06Q 10/08* (2012.01)
(52) U.S. Cl.
CPC .................. *G06Q 10/087* (2013.01)
(58) Field of Classification Search
CPC ...................................... G06Q 10/087
USPC ........................................... 705/28
See application file for complete search history.

(56) References Cited

U.S. PATENT DOCUMENTS

| 8,175,925 | B1* | 5/2012 | Rouaix ........................... 705/22 |
| 2005/0068182 | A1* | 3/2005 | Dunlap ................... B29C 45/14 340/572.8 |
| 2008/0140478 | A1 | 6/2008 | Goldberg |
| 2008/0143532 | A1* | 6/2008 | Murrah ............... G06K 19/0717 340/572.4 |
| 2009/0059270 | A1 | 3/2009 | Opalach |
| 2009/0121017 | A1* | 5/2009 | Cato et al. ..................... 235/385 |
| 2009/0204512 | A1 | 8/2009 | Connell |
| 2011/0011936 | A1* | 1/2011 | Morandi et al. .............. 235/454 |
| 2013/0051611 | A1* | 2/2013 | Hicks ............................ 382/103 |

FOREIGN PATENT DOCUMENTS

| CN | 101809601 | 8/2010 | |
| IT | WO 2011098872 A1 * | 8/2011 | ........... A01N 1/0252 |
| JP | 2001088912 | 4/2001 | |
| KR | 1020090015285 | 2/2009 | |
| TW | 200411470 | 7/2004 | |

OTHER PUBLICATIONS

Taiwan Search Report for Application No. 102112158, 2 pages, Nov. 10, 2014.
PCT Search Report and Written Opinion, PCT/US2012/032420, 11 pages, Feb. 19, 2013.

* cited by examiner

*Primary Examiner* — Hunter Wilder
(74) *Attorney, Agent, or Firm* — Blakely, Sokoloff, Taylor & Zafman LLP (57) ABSTRACT

A method and apparatus for attending to a supply of product at a position on a store shelf involves receiving an electronic image of the position on a store shelf and comparing the electronic image to a previous electronic image of the position on the store shelf. Depending of the difference, if any, between the two images, generating an indication to attend to the supply of product at the position on the store shelf.

18 Claims, 6 Drawing Sheets

METHOD AND APPARATUS FOR MANAGING PRODUCT PLACEMENT ON STORE SHELF

The present patent application is a U.S. National Phase Application under 35 U.S.C. 371 of International Application No. PCT/US2012/032420 filed Apr. 5, 2012.

TECHNICAL FIELD

Embodiments of the invention relate to a system for automatically detecting a need to attend to the supply of product at its assigned position on a store shelf.

BACKGROUND ART

Shelving in stores, for example, a grocery store, are stocked and restocked with products on a periodic and on-going basis. Store employees spend a significant part of their day stocking, restocking, re-locating, re-arranging product, and removing old, expired, or seasonal products, on the shelves. Much of that time is spent walking up and down aisles in the store, inspecting the positions or locations of products on the shelves, to determine whether there is a need to restock, relocate, rearrange, or remove products at appropriate locations on the shelves. For example, if a supply of a particular product is low or has run out at its location on the shelf, the employee needs to retrieve further of that product from inventory, and restock the shelf at that location. If a product is in an incorrect location or askew, the employee needs to relocate or rearrange the product in its appropriate location on the same or a different shelf, as the case may be. If a product, such as fresh produce, or an otherwise perishable item of food, has spoiled or reached a "pull-date" or expiration date, the product needs to be removed. What is needed is a way to automatically determine whether there is a need to restock, relocate, rearrange or remove products at appropriate locations on the store shelves.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DESCRIPTION OF THE EMBODIMENTS

Figure 1:
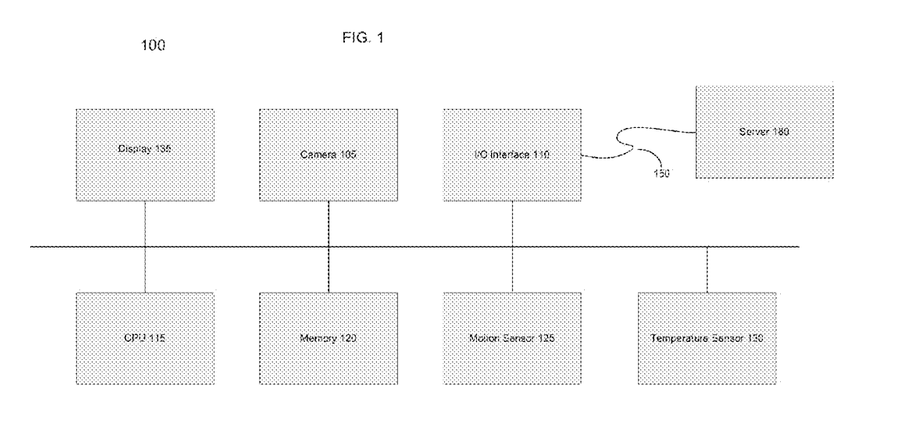
FIG. 1 is a block diagram of a system according to embodiments of the invention.

Embodiments of a method and apparatus for attending to the supply of product at a location on a store shelf is described below with reference to FIGS. 1, 2, 3A-3D. A system according to one embodiment of the invention is illustrated in FIG. 1. The system includes an apparatus, referred to herein as a digital sign module, or micro digital signage (MDS) unit 100. The MDS unit is located on, or near, or on the edge of, a shelf in a store. The MDS unit according to one embodiment includes at a minimum, one or more electronic image capture devices 105, which may be any type of device that captures an electronic image, such as a video camera or digital camera, and a Input/Output (I/O) interface 110, such as a network interface. The network interface may adhere to one of the Institute of Electrical and Electronic Engineers (IEEE) 802.11 standards for implementing wireless local area network (Wi-Fi) computer communication 150 over various well known radio frequency bands. The I/O device may implement additional or other wireless communication standards, for example, standards relating to cellular mobile telecommunications or Bluetooth™ wireless technology.

In one embodiment, the MDS unit's camera(s) may be located on a shelf in a store and point away from the shelf. For example, a camera may point toward a shelf on the other side of an aisle in the store from the shelf on which the camera is mounted. The camera so positioned can capture electronic images, e.g., digital pictures, of locations on the shelf on other side of the aisle. In capturing pictures of locations on the shelf, the camera is also capturing an electronic representation, in picture form, of a state of supply of products on the shelf at that location. The camera may be operable to rotate horizontally and/or vertically to point and capture pictures at various locations to the left and right and on multiple shelves in the aisle. In another embodiment, the MDS unit's camera may be mounted on a ceiling in the store in between, or at the intersection of, aisles and be rotatable to point and capture pictures at various locations on multiple shelves on one or more sides of one or more aisles. In another embodiment, multiple cameras may be networked to communicate with the I/O interface 110 and thereby capture pictures throughout multiple locations in the store.

In one embodiment, the MDS unit 100 comprises a processor 115 and memory 120 that operates in conjunction with camera 105 to store pictures captured by camera 105 for subsequent transmission by I/O interface 110 to a server 180 for further processing as described below. MDS unit 100 may also include an electronic or digital display screen 135, for example a touch-sensitive display. The display, operating in conjunction with processor 115 and memory 120, can retrieve from memory and display advertisements or pricing information relating to products located on or near a shelf where the MDS unit, or at least the display screen of the MDS unit, is mounted. The display screen may display, in one embodiment, labels or symbols, such as bar codes or quick response (QR) codes, so that a store employee or patron may obtain information regarding a product co-located on a shelf with the display screen. In one embodiment, multiple display screens may be embodied in MDS unit 100 to display advertisements or pricing information for multiple products located at or near a shelf where an MDS unit is mounted, or where a camera coupled to the MDS unit is mounted, or located in range of view of a camera coupled to the MDS unit. In one embodiment, the camera may capture the labels or symbols displayed on the digital display screen associated with a particular product. Such information may be forwarded with or without a picture of the particular product to server 180 for further processing as described below.

It is appreciated that MDS unit 100 and the components described therein could be implemented in an electronic device such as, and without limitation, a mobile device, a personal digital assistant, a mobile computing device, a smart phone, a cellular telephone, a computer, a personal computer (PC), a desktop computer, a laptop computer, a notebook computer, a handheld computer, a tablet computer, a network appliance, or a web appliance.

Finally, the MDS unit, in one embodiment, may include one or more sensors in addition to a camera 105, such as a motion detection sensor 125, a temperature sensor 130, or a location-based sensor (not shown) that operates in conjunction with processor 115, cellular, Wi-Fi, and Global Positioning Systems (GPS) to determine a location of the MDS unit and/or a product on a shelf in a store. This information may be forwarded with or without a picture of the product captured by the MDS unit's camera and forwarded to server 180 for further processing as described below.

In one embodiment, the MDS unit avoids taking pictures of the locations of shelves in the range of view of its camera(s) at times when the locations may otherwise be obscured by persons or objects such as a shopping cart, bulk inventory, or a product display station, by first checking via the motion detector 125 that there is little motion, no motion, or that motion is below a configurable threshold, in the vicinity of the MDS unit and in particular in the range of view of the MDS unit's camera, when taking a picture.

Temperature sensor 130 may be used in one embodiment to detect temperature conditions that might indicate a potential or actual change in state of products located near the MDS unit. For example, if a temperature sensor, in or coupled to an MDS unit, attached to a shelf in a refrigeration or freezer unit detects a rise in temperature or a temperature that exceeds a configurable threshold, MDS unit 100 can send a notification of such to server 180.

In one embodiment, a server 180 may not be used. Rather, MDS unit may include a video processing unit or graphics processing unit and corresponding video analytic software to locally process pictures taken by the camera. The video or graphics processing unit may replace or be in addition to processor 115. In such an embodiment, the operations described herein in conjunction with server 180 executing video analytic software, may operate in the same manner in conjunction with a local video or graphics processing unit executing such software, with no need for MDS unit to communicate over link 150 to server 180. In one embodiment, the MDS unit with a graphics or video processor is a mobile computing device with accompanying application software necessary to fully implement an embodiment of the invention. It is appreciated that the mobile computing device could be a cell phone, a smartphone, a personal digital assistant, a tablet computer, a laptop computer, a notebook computer, a handheld computer, or other mobile device including mobile internet devices.

Figure 2:
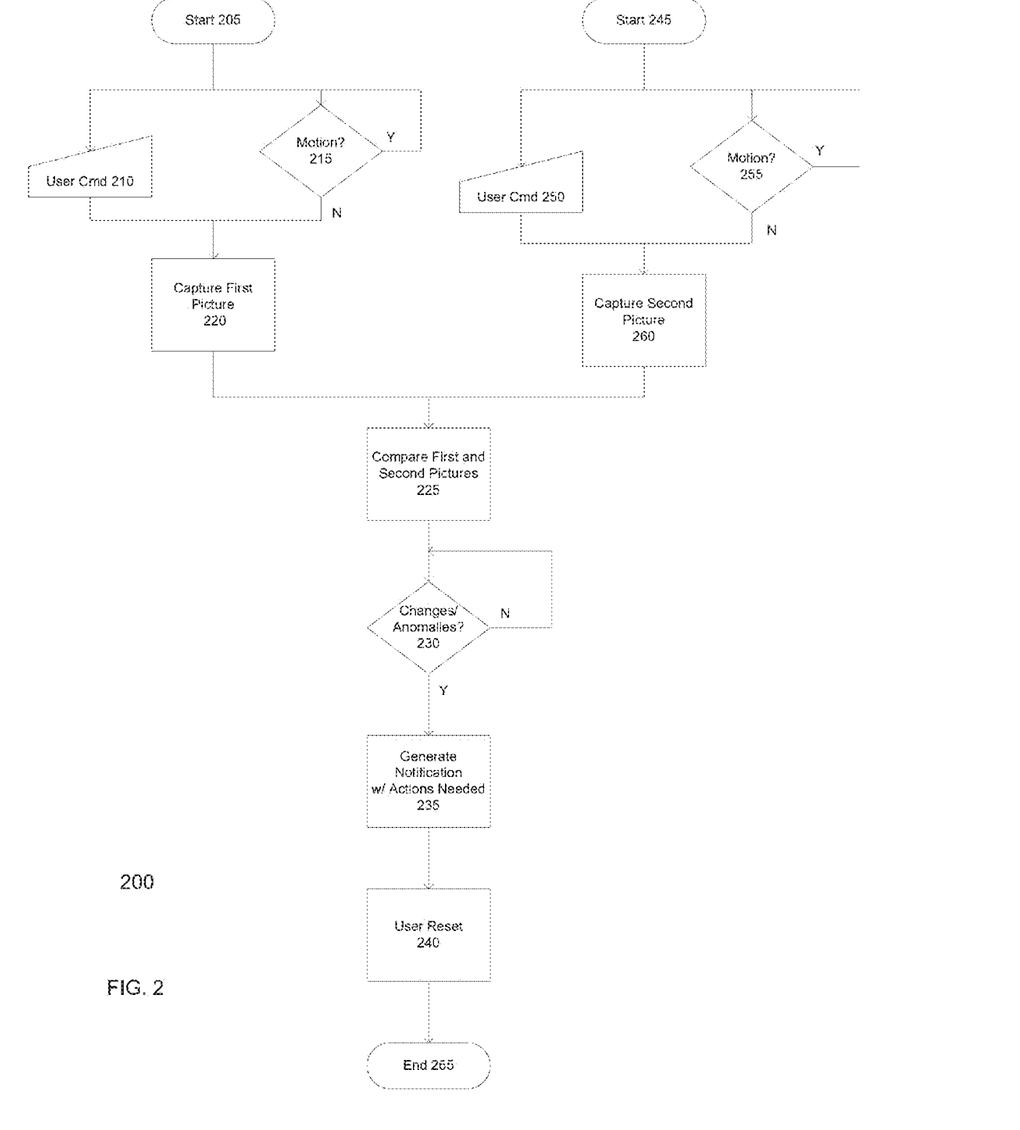
FIG. 2 is a flow diagram according to embodiments of the invention

With reference to FIG. 2, an embodiment of the invention operates as follows. The process starts at 205 with MDS unit (in particular, motion sensor 125) checking at 215 whether there is any motion in or near the MDS unit's camera, in particular, in a position or location on a shelf that is in the range of view of the camera. If there is motion, the process loops until no motion is detected, or until there is little motion, or if there is motion, until such motion falls within an acceptable range or below a configurable threshold. Hereinafter, reference to "detecting no motion" is meant to include all the above manners of checking for motion or lack thereof. It is further appreciated that in other embodiments, another type of sensor in the MDS unit may detect other conditions based on one or more of the following criteria: date, time of day, temperature, a state of the supply of product at the position on the store shelf as indicated in an electronic representation of the supply of product on the store shelf in the electronic image, and a label or code on the product or on the store shelf or on a digital display screen at or near the position of the product on the store shelf. For example, if a state of the supply of a product at a position on the store shelf as indicated in a picture of the product shows a perishable item has indeed perished or spoiled, the process continues past step 215.

Alternatively, at 210, the MDS unit receives user input, for example, from a store employee operating MDS unit 100, triggering the MDS unit to take a picture with its camera. Thus, when no motion is detected or when user input triggers the MDS unit, a picture is taken at 220. This first picture is an initial picture, or baseline picture, that may be taken, for example, at the beginning of a day before or as a store opens for business, when the shelves are fully stocked with product for the day. The picture could also occur during the day, for example, after a shelf in view of the camera has been stocked, restocked, rearranged, becomes empty, or after a user resets at 240 the MDS unit, for example, when accepting the current state of supply of product at the location on the store's shelf. The MDS unit transmits this first picture to server 180 for later processing. The process then waits or is temporarily suspended.

At a later point in time, for example, after a configurable period of time, such as every minute, or every hour, or after a known busy shopping time, such as just after shoppers stop by to get groceries at a grocery store on the way home from work in the evening, or the end of the business day before shelves are restocked with product, the process restarts at 245 with MDS unit checking at 255 for a condition that causes the process to continue on past 255. For example the MDS unit checks if any motion is occurring at a position on a shelf that is in or near the MDS unit's camera, in particular, in the range of view of the camera. If there is motion, the process loops until little or no motion is detected. Alternatively, at 250, the MDS unit receives user input, for example, from a store employee operating MDS unit 100, triggering the MDS unit to take a picture. When no motion is detected or when user input triggers the MDS unit, a picture is taken at 260.

The MDS unit transmits this subsequent, or second, picture to server 180. Video analytic software operating on server 180 compares at 225 this second picture captured at 260 with the first picture captured at 220. The server compares the second picture to the first picture, detecting whether there is a difference between an electronic representation of the supply of product on the store shelf in the second picture compared to an electronic representation of the supply of product on the store shelf in the first picture. In one embodiment, the comparison detects whether the supply of product on the store shelf is at or below a minimum threshold supply of product on the store shelf (for example, whether the shelf is empty at that location), whether the supply of product on the store shelf includes an incorrect or misplaced product, and whether the supply of product is askew or otherwise is out of arrangement.

If there are differences between the pictures, or if any other anomalies are detected, at 230, the process continues to 235 where the server sends a notification that actions need to be taken with respect to the supply of product on the store shelf at the location of the pictures. The notification may be sent to MDS unit 100 via wireless link 150, or may be sent to a store employee's end user device, such as a smart phone, tablet computing device, point-of-sale terminal, or inventory tracking device, via electronic mail message, electronic text message, or other electronic form or means indicating what action needs to be taken. In one embodiment, the notification may include details of the action to be taken, such as to resupply a product at a particular location on a particular shelf in a particular aisle of the store, or to rearrange product that has been re-shelved to an incorrect or inappropriate location, or to reorder product that is askew or otherwise not facing or oriented in an appropriate location on a shelf.

A store employee, upon receiving the notification, may choose to ignore it depending on considerations such as the time of day and knowledge of back-room inventory supply, or may take steps to address the issues noted in the notification. The employee may then provide input in the form of an acknowledgment, either via MDS unit 100 or the employee's end-user device, which is communicated to server 180. The acknowledgement may indicate that the supply of product identified in the notification has been attended to, or not. The server, upon receiving the acknowledgement, resets the indication and updates appropriate information stores accordingly.

Figure 3A:
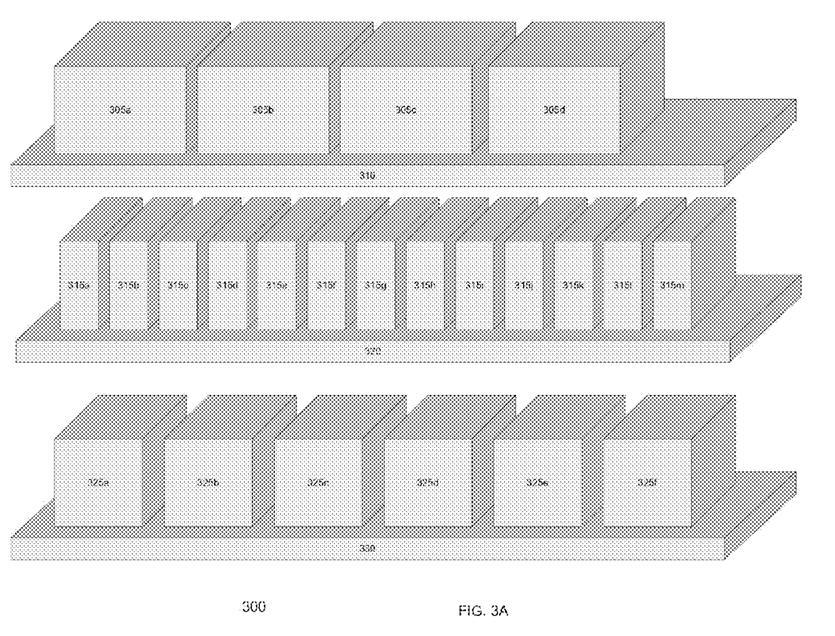
FIG. 3A illustrates a first picture in accordance with an embodiment of the invention.
Figure 3B:
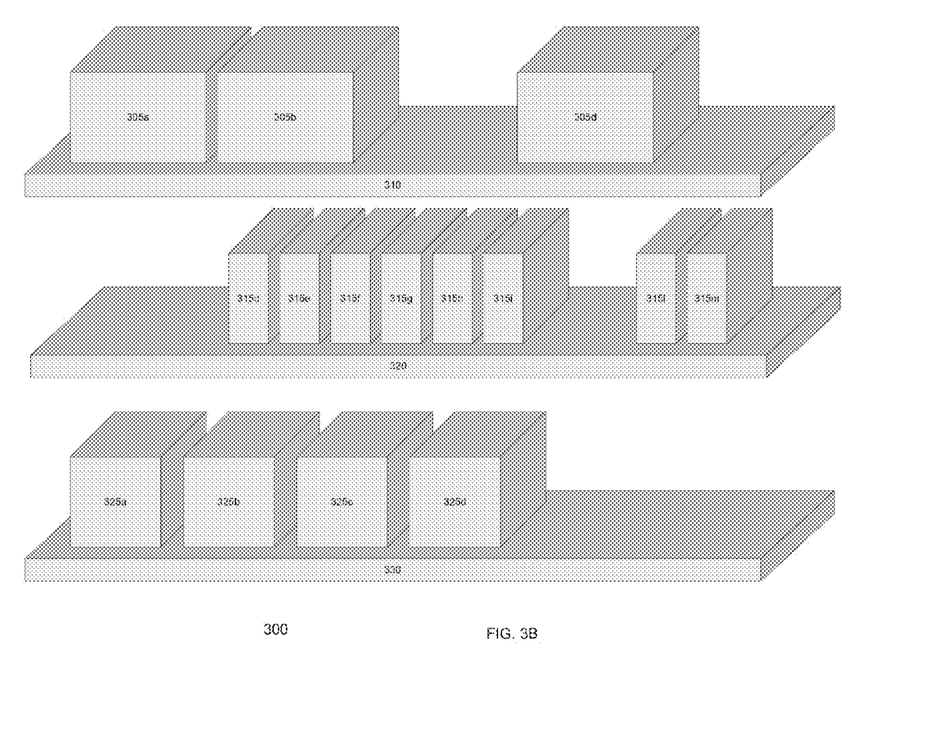
FIG. 3B illustrates a second picture in accordance with an embodiment of the invention.
Figure 3C:
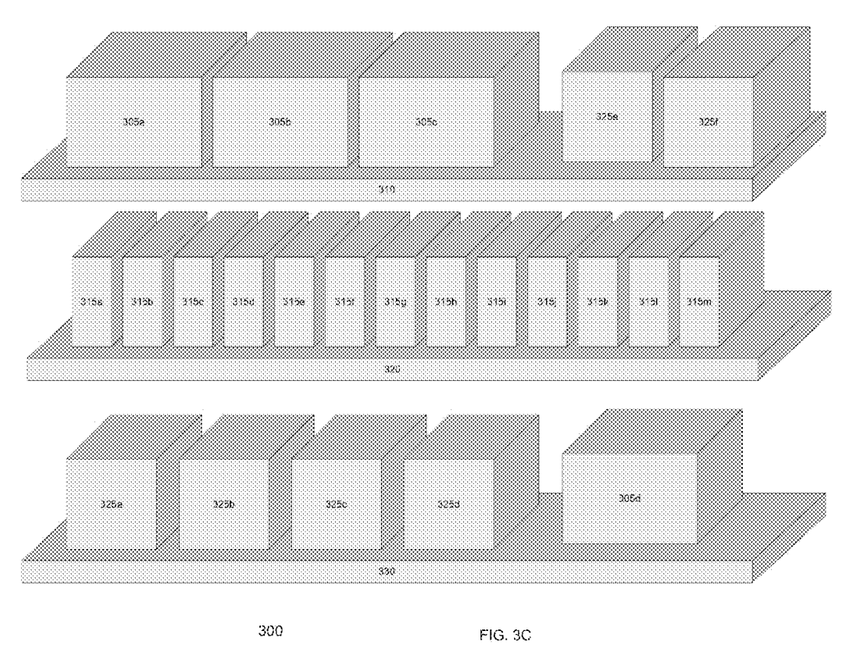
FIG. 3C illustrates a second picture in accordance with an embodiment of the invention.
Figure 3D:
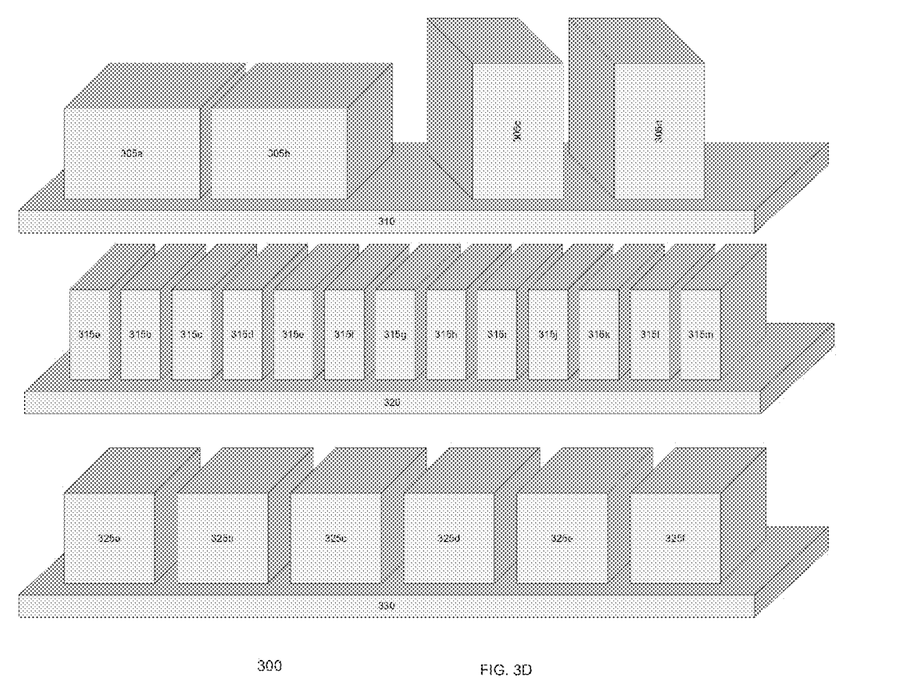
FIG. 3D illustrates a second picture in accordance with an embodiment of the invention.

FIG. 3A illustrates at 300 three rows of shelves, namely, rows 310, 320 and 330. Similar products 305a-305d are located on top shelf 310, while products 315a-315m are placed in an orderly arrangement on middle shelf 310, and products 325a-325f are located on bottom shelf 330. A first picture taken at 220 as described above in connection with the flowchart in FIG. 2 might capture this arrangement of products in an electronic image, for example, at the beginning of a day. This picture is forwarded to server 180. FIGS. 3B-3D illustrate subsequent pictures that might be taken of the same location of shelves. Note in FIG. 3B that some product is missing. For example, during the day, product 305c is selected by a consumer for purchase and so is missing on shelf 310. Likewise, products 315a, 315b, 315c, 315j and 315k have been removed from shelf 320, and products 325e and 325f have been taken from shelf 330. A second picture taken as described above at 260 in FIG. 2 might capture this arrangement of products in an electronic image, for example, after evening rush hour. This picture too is forwarded to server 180. Server 180 executing video analytic software compares the first and second pictures and detects a difference given the missing products in the second versus the first picture. Upon detecting this change, server 180 sends a message as described above to MDS unit 100 or a store employee's end-user device indicating that products on shelves 310, 320 and 330 need to be resupplied. The notice may include further details for example which particular products and the amount of those particular products that need to be resupplied. The process then ends at 265.

FIG. 3C illustrates products 325e and 325f have been misplaced on shelf 310 instead of shelf 330, and product 305d has been re-shelved incorrectly on shelf 330 instead of shelf 310. A second picture taken as described above at 260 in FIG. 2 captures this arrangement of products in a picture that is forwarded to server 180. Server 180 and accompanying executing video analytic software compares the first and second pictures and detects a difference given the incorrectly located products, in the second versus the first picture. Upon detecting this change, server 180 sends a message as described above to MDS unit 100 or a store employee's end-user device indicating that products on shelves 310 and 330 need to be resupplied or rearranged.

FIG. 3D illustrates products 305c and 305d askew on shelf 310. These products need to be reoriented for proper viewing by the consumer. A second picture taken as described above at 260 in FIG. 2 captures this view of products in a picture that is then forwarded to server 180. Server 180 and accompanying executing video analytic software compares the first and second pictures and detects a difference given the askew products in the second versus the first picture. Upon detecting this change, server 180 sends a message as described above to MDS unit 100 or the store employee's end-user device indicating that the products on shelf 310 need to be rearranged.

The following examples pertain to further embodiments. One embodiment involves a method for attending to a supply of product at a position on a store shelf, comprising: receiving an electronic image of the position on a store shelf; comparing the electronic image to a previous electronic image of the position on the store shelf; and generating an indication to attend to the supply of product at the position on the store shelf based on the analysis. In one embodiment, this method further comprises receiving the previous electronic image of the position on the store shelf In one embodiment, receiving the previous electronic image comprises capturing the previous electronic image in response to receiving a user command or input from a sensor that detects a condition. In the above embodiment, receiving the electronic image of the position on the store shelf comprises capturing the electronic image in response to receiving a user command or input from a sensor that detects a condition.

In one embodiment, the user command or input from a sensor that detects a condition is based on at least one of date, time of day, motion detection, temperature detection, a state of the supply of product at the position on the store shelf as indicated in an electronic representation of the supply of product on the store shelf in the electronic image, and a label or code on the product or on the store shelf at the position of the product on the store shelf.

In one embodiment, comparing the electronic image to a previous electronic image comprises detecting whether there is a difference between an electronic representation of the supply of product on the store shelf in the electronic image compared to an electronic representation of the supply of product on the store shelf in the previous electronic image. In one embodiment, the comparison detects one of: the supply of product on the store shelf is at or below a minimum threshold supply of product on the store shelf, the supply of product on the store shelf includes an incorrect or misplaced product, and the supply of product is askew or otherwise is out of arrangement. In one embodiment, generating an indication to attend to a supply of product at the position on the store shelf based on the analysis comprises generating the indication when there is a difference between an electronic representation of the supply of product on the store shelf in the electronic image compared to an electronic representation of the supply of product on the store shelf in the previous electronic image.

One embodiment further comprises receiving at an end user device the indication to attend to a supply of product at the position on the store shelf; transmitting from the end user device an acknowledgment in response to receiving the indication; and resetting the indication in response to receiving the acknowledgment. In one embodiment, transmitting the acknowledgment in response to receiving the indication comprises transmitting an acknowledgment that the supply of the product at the position on the store shelf has been attended to or not.

In one embodiment, the method for attending to a supply of product at a position on a store shelf, comprises generating at an electronic image capture device a first electronic image of the position on a store shelf, generating at the device a second electronic image of the position on a store shelf, and generating an indication to attend to the supply of product at the position on the store shelf based on a comparison of the first and second electronic images. In one embodiment, generating the first and second electronic images comprises capturing the images in response to receiving a user command or input from a sensor that detects a condition. In one embodiment, the user command or input from a sensor that detects a condition is based on at least one of date, time of day, motion detection, temperature detection, a state of the supply of product at the position on the store shelf as indicated in an electronic representation of the supply of product on the store shelf in the electronic image, and a label or code on the product or on the store shelf at the position of the product on the store shelf. In one embodiment, generating the indication to attend to a supply of product at the position on the store shelf based on a comparison comprises generating the indication when there is a difference between an electronic representation of the supply of product on the store shelf in the second electronic image compared to an electronic representation of the supply of product on the store shelf in the first electronic image. One embodiment further comprises generating an acknowledgment in response to the indication.

A system for attending to a supply of product at a position on a store shelf, according to one embodiment, comprises an electronic image capture device to capture and transmit an electronic image of the position on a store shelf, a processor executing video analytic software coupled to the electronic image capture device to receive the electronic image and compare the electronic image to a previous electronic image of the position on the store shelf and generate an indication to attend to the supply of product at the position on the store shelf based on the analysis. In one embodiment, the system further comprises a communications interface coupled to the electronic image capture device via which to transmit the electronic image. According to one embodiment, the electronic image capture device captures and transmits the previous electronic image of the position on the store shelf.

One embodiment further comprises a sensor coupled to the electronic image capture device to cause the device to capture the electronic image in response to the sensor detecting a condition. In one embodiment, the condition comprises one of date, time of day, detection of motion, and detection of temperature. In one embodiment of the system, the processor executing video analytic software to compare the electronic image to a previous electronic image of the position on the store shelf detects whether there is a difference between an electronic representation of the supply of product on the store shelf in the electronic image compared to an electronic representation of the supply of product on the store shelf in the previous electronic image.

In one embodiment, the system's processor further receives an acknowledgment in response to generating the indication and resets the indication in response to receiving the acknowledgment. In one embodiment, an end-user device is communicatively coupled to the processor to receive the indication and transmit the acknowledgment.

According to one embodiment, at least one machine readable medium comprises a plurality of instructions that in response to being executed on a computing device, cause the computing device to receive a first electronic image of the position on a store shelf, receive a second electronic image of the position on a store shelf, compare the second electronic image to the first electronic image of the position on the store shelf, and generate an indication to attend to the supply of product at the position on the store shelf based on the analysis. In one embodiment, the machine readable medium of claim includes further instructions wherein receiving the first and second electronic images comprises instructions for capturing the images in response to receiving a user command or input from a sensor that detects a condition. In one embodiment, the user command or input from a sensor that detects a condition is based on at least one of date, time of day, motion detection, temperature detection, and a state of the supply of product at the position on the store shelf. In one embodiment, the comparison detects one of: the supply of product on the store shelf is at or below a minimum threshold supply of product on the store shelf, the supply of product on the store shelf includes an incorrect or misplaced product, and the supply of product is askew or otherwise is out of arrangement.

According to one embodiment of the invention, at least one machine readable medium comprises a plurality of instructions that in response to being executed on a computing device, cause the computing device to generate at an electronic image capture device a first electronic image of the position on a store shelf, generate at the device a second electronic image of the position on a store shelf, and generate an indication to attend to the supply of product at the position on the store shelf based on a comparison of the first and second electronic images. In one embodiment, generating the first and second electronic images comprises capturing the images in response to receiving a user command or input from a sensor that detects a condition based on at least one of date, time of day, motion detection, temperature detection, a state of the supply of product at the position on the store shelf as indicated in an electronic representation of the supply of product on the store shelf in the electronic image, and a label or code on the product or on the store shelf at the position of the product on the store shelf In one embodiment, generating the indication to attend to a supply of product at the position on the store shelf based on a comparison comprises generating the indication when there is a difference between an electronic representation of the supply of product on the store shelf in the second electronic image compared to an electronic representation of the supply of product on the store shelf in the first electronic image.

CONCLUSION

In this description, numerous details have been set forth to provide a more thorough explanation of embodiments of the present invention. It should be apparent, however, to one skilled in the art, that embodiments of the present invention may be practiced without these specific details. In other instances, well-known structures and devices have been shown in block diagram form, rather than in detail, in order to avoid obscuring embodiments of the present invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appear from the description herein. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

The invention claimed is:

1. A computer-implemented method comprising:
   capturing, by an image capturing device of a computing device representing a micro digital signage (MDS) unit having a processor and a memory coupled to the processor, a first electronic image of a position capable of hosting a product on a store shelf in a store, wherein capturing is performed in response to receiving a user command, wherein the MDS unit is placed on or near the store shelf or one or more edges of the store shelf and includes a display device coupled to the processor and the memory such that the display device is capable of retrieving from the memory one or more of advertisement data and pricing information relating to products placed on or near the store shelf while ignoring the store shelf when the store shelf lacks product activity or is obscured by one or more of persons and objects;
   comparing, by the processor, the first electronic image to a second electronic image of the position on the store shelf, wherein the first electronic image includes a current electronic image, and wherein the second electronic image includes a previous electronic image; and
   generating, by the processor, an indication to attend to supplying of the product at the position on the store shelf upon a determination that the second electronic image of the position on the store shelf does not match the first electronic image of the position on the store shelf, and
   wherein the indication is further generated, by the processor, based on continuous detection or periodic detection, by one or more temperature sensors, of temperature conditions associated with one or more products to identify need for supplying or removing of the one or more products from one or more positions on one or more shelves associated with a cooler or a freezer in the store, wherein the temperature conditions indicate potential or actual changes in state of the one or more products based on a rise in temperature or a temperature exceeding a configurable threshold, wherein the one or more temperature sensors are coupled with the computing device and attached to or embedded in the one or more positions on the one or more shelves, wherein the periodic detection is determined in accordance with one or more configurable time periods based on one or more of minutes, hours, days, mornings, nights, business hours, shopping seasons, and natural seasons.

2. The method of claim 1, further comprising receiving the previous electronic image of the position on the store shelf, wherein the current electronic image is taken upon occurrence of a configurable time period after taking of the previous electronic image, wherein the configurable time period includes at least one of a predetermined time period, busy shopping time, and end of business day, and
   wherein the indication is ignored or rejected based on one or more considerations including time of day or knowledge of inventory supply including back-room inventory or current inventory at the store or other stores, and wherein the inventory supply is tracked using an inventory tracking device.

3. The method of claim 2, wherein receiving the previous electronic image comprises capturing the previous electronic image in response to an input from a sensor that detects a condition, and wherein receiving the electronic image of the position on the store shelf comprises capturing the current electronic image in response to receiving a user command or input from a sensor that detects a condition.

4. The method of claim 3 wherein the user command or input from the sensor that detects a condition is based on at least one of date, time of day, motion detection, temperature detection, a state of the supply of product at the position on the store shelf as indicated in an electronic representation of the supply of product on the store shelf in the current electronic image, and a label or code on the product or on the store shelf at the position of the product on the store shelf.

5. The method of claim 1, wherein comparing the current electronic image to the previous electronic image comprises detecting whether there is a difference between an electronic representation of the supply of product on the store shelf in the current electronic image compared to an electronic representation of the supply of product on the store shelf in the previous electronic image.

6. The method of claim 5, wherein the comparison detects one of: the supply of product on the store shelf is at or below a minimum threshold supply of product on the store shelf, the supply of product on the store shelf includes an incorrect or misplaced product, and the supply of product is askew or otherwise is out of arrangement.

7. The method of claim 6, wherein generating an indication to attend to a supply of product at the position on the store shelf based on the analysis comprises generating the indication when there is a difference between an electronic representation of the supply of product on the store shelf in the current electronic image compared to an electronic representation of the supply of product on the store shelf in the previous electronic image.

8. The method of claim 7, further comprising:
receiving at an end user device the indication to attend to a supply of product at the position on the store shelf;
transmitting from the end user device an acknowledgment in response to receiving the indication; and
resetting the indication in response to receiving the acknowledgment.

9. The method of claim 8, wherein transmitting an acknowledgment in response to receiving the indication comprises transmitting an acknowledgment that the supply of the product at the position on the store shelf has been attended to or not.

10. A system comprising:
an electronic image capture device of a computing device representing a micro digital signage (MDS) unit to capture and transmit a first electronic image of a position capable of hosting a product on a store shelf in a store, wherein capturing is performed in response to receiving a user command, wherein the MDS unit is placed on or near the store shelf or one or more edges of the store shelf and includes a display device coupled to the processor and the memory such that the display device is capable of retrieving from the memory one or more of advertisement data and pricing information relating to products placed on or near the store shelf while ignoring the store shelf when the store shelf lacks product activity or is obscured by one or more of persons and objects; and
a processor executing video analytic software coupled to the electronic image capture device of the computing device to receive the first electronic image and compare the first electronic image to a second electronic image of the position on the store shelf, wherein the first electronic image includes a current electronic image, and wherein the second electronic image includes a previous electronic image, and generate an indication to attend to supplying of the product at the position on the store shelf upon a determination that the second electronic image of the position on the store shelf does not match the first electronic image of the position on the store shelf, and
wherein the indication is further generated based on continuous detection or periodic detection, by one or more temperature sensors, of temperature conditions associated with one or more products to identify need for supplying or removing of the one or more products from one or more positions on one or more shelves associated with a cooler or a freezer in the store, wherein the temperature conditions indicate potential or actual changes in state of the one or more products based on a rise in temperature or a temperature exceeding a configurable threshold, wherein the one or more temperature sensors are coupled with the computing device and attached to or embedded in the one or more positions on the one or more shelves, wherein the periodic detection is determined in accordance with one or more configurable time periods based on one or more of minutes, hours, days, mornings, nights, business hours, shopping seasons, and natural seasons.

11. The system of claim 10 further comprising a communications interface coupled to the electronic image capture device via which to transmit the electronic image, wherein the current electronic image is taken upon occurrence of a configurable time period after taking of the previous electronic image, wherein the configurable time period includes at least one of a predetermined time period, busy shopping time, and end of business day, and
wherein the indication is ignored or rejected based on one or more considerations including time of day or knowledge of inventory supply including back-room inventory or current inventory at the store or other stores, and wherein the inventory supply is tracked using an inventory tracking device.

12. The system of claim 10, wherein the electronic image captured device further to capture and transmit the previous electronic image of the position on the store shelf.

13. The system of claim 10, further comprising a sensor coupled to the electronic image capture device to cause the device to capture the current electronic image in response to the sensor detecting a condition, wherein the condition comprises one of date, time of day, detection of motion, and detection of temperature.

14. The system of claim 10, wherein the processor executing video analytic software to compare the current electronic image to a previous electronic image of the position on the store shelf comprises the processor to detect whether there is a difference between an electronic representation of the supply of product on the store shelf in the current electronic image compared to an electronic representation of the supply of product on the store shelf in the previous electronic image.

15. The system of claim 10 wherein the processor further to:
receive an acknowledgment in response to generating the indication; and
reset the indication in response to receiving the acknowledgment.

16. At least one non-transitory machine readable medium comprising a plurality of instructions that in response to being executed on a computing device, cause the computing device to:
capture a first electronic image of the position capable of hosting a product on the store shelf in a store, wherein capturing is performed in response to receiving a user command, wherein the computing device represents a micro digital signage (MDS) unit that is placed on or near the store shelf or one or more edges of the store shelf and includes a display device coupled to the processor and the memory such that the display device is capable of retrieving from the memory one or more of advertisement data and pricing information relating to products placed on or near the store shelf while ignoring the store shelf when the store shelf lacks product activity or is obscured by one or more of persons and objects;
compare the first electronic image to a second electronic image of the position on the store shelf, wherein the first electronic image includes a current electronic image, and wherein the second electronic image includes a previous electronic image; and
generate an indication to attend to supplying of the product at the position on the store shelf upon a determination that the second electronic image of the position on the store shelf does not match the first electronic image of the position on the store shelf, and
wherein the indication is further generated based on continuous detection or periodic detection, by one or more temperature sensors, of temperature conditions associated with one or more products to identify need for supplying or removing of the one or more products from one or more positions on one or more shelves associated with a cooler or a freezer in the store, wherein the temperature conditions indicate potential or actual changes in state of the one or more products based on a rise in temperature or a temperature exceeding a configurable threshold, wherein the one or more temperature sensors are coupled with the computing device and attached to or embedded in the one or more positions on the one or more shelves, wherein the periodic detection is determined in accordance with one or more configurable time periods based on one or more of minutes, hours, days, mornings, nights, business hours, shopping seasons, and natural seasons.

17. The at least one machine readable medium of claim 16, wherein the first and second electronic images captured or received, respectively, in response to input from a sensor that detects a condition, wherein the user command or input from a sensor that detects a condition is based on at least one of date, time of day, motion detection, temperature detection, and a state of the supply of product at the position on the store shelf, wherein the current electronic image is taken upon occurrence of a configurable time period after taking of the previous electronic image, wherein the configurable time period includes at least one of a predetermined time period, busy shopping time, and end of business day, and
wherein the indication is ignored or rejected based on one or more considerations including time of day or knowledge of inventory supply including back-room inventory or current inventory at the store or other stores, and wherein the inventory supply is tracked using an inventory tracking device.

18. The at least one machine readable medium of claim 16, wherein the comparison detects one of: the supply of product on the store shelf is at or below a minimum threshold supply of product on the store shelf, the supply of product on the store shelf includes an incorrect or misplaced product, and the supply of product is askew or otherwise is out of arrangement.

* * * * *